March 12, 1963  J. JACQUEMOND  3,080,987
MINE-CARS

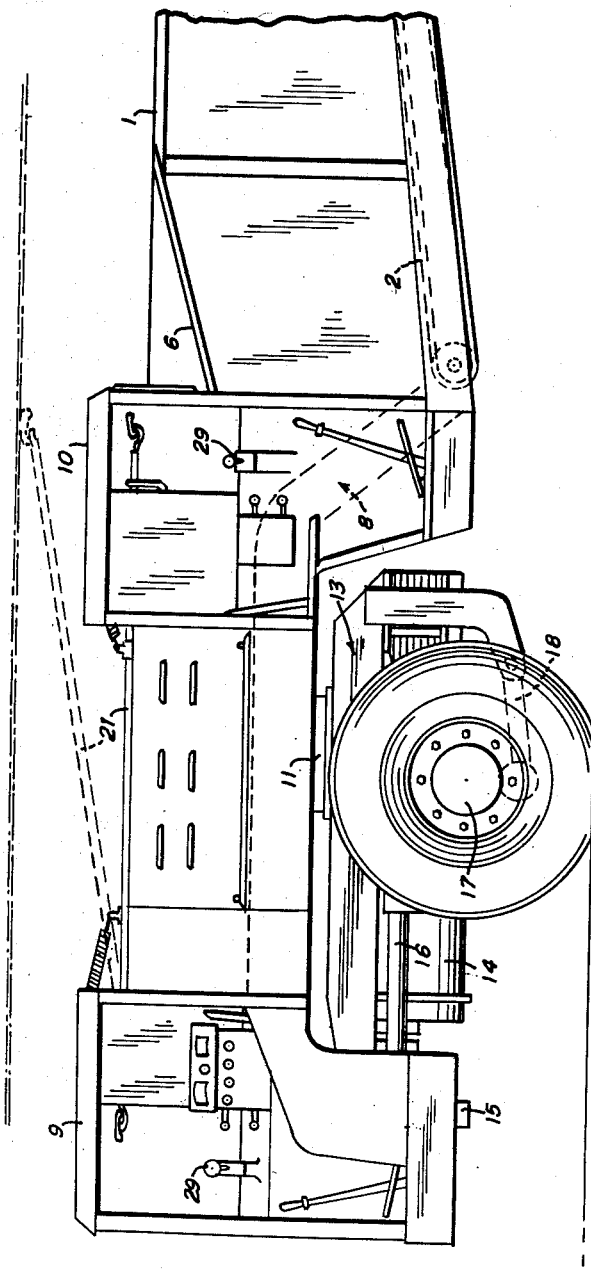

Filed Feb. 9, 1959

7 Sheets-Sheet 5

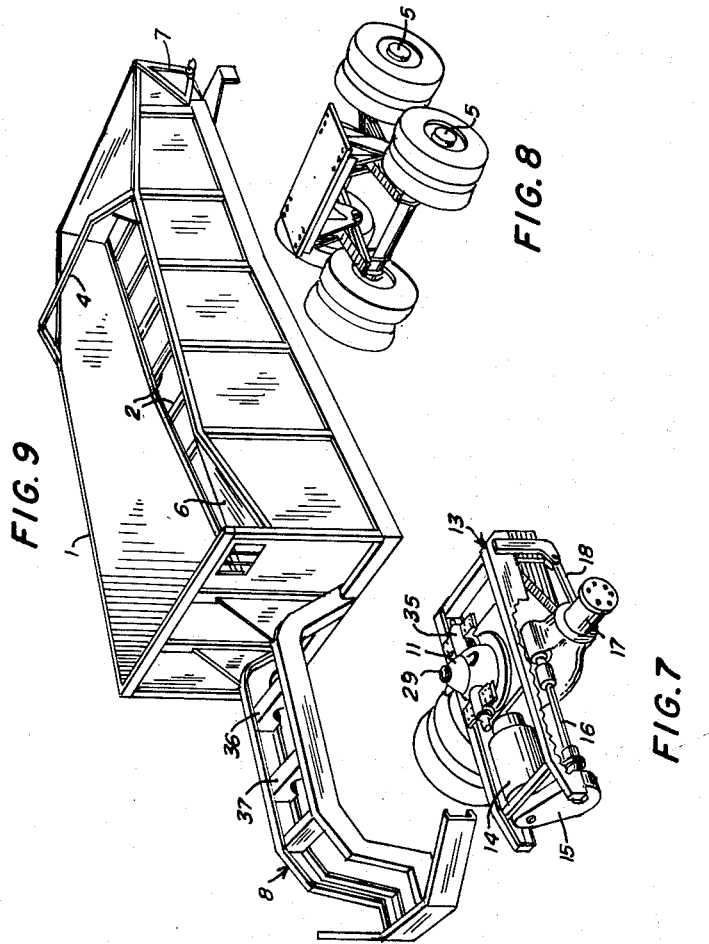

United States Patent Office 3,080,987
Patented Mar. 12, 1963

3,080,987
MINE-CARS
Jean Jacquemond, 6 Rue Borghese,
Neuilly-sur-Seine, France
Filed Feb. 9, 1959, Ser. No. 792,079
Claims priority, application France Feb. 12, 1958
3 Claims. (Cl. 214—83.36)

This invention relates to loading vehicles adapted principally to move in the drifts and galleries of mine workings or civil engineering works, that is vehicles which have usually to be loaded mechanically and to circulate in both directions without being turned round.

The vehicle according to the invention differs from this type of vehicle known in the art not only by its general arrangement but also by the following constructional features.

The vehicle is related to the single-axle tractor and a semi-trailer type body, with the difference that the tractor proper and the semi trailer do not constitute separate units, all the devices forming part of the driving mechanism being distributed between the two units which thus become practically inseparable in their operation.

The semi-trailer, in the form of a gondola, comprises at least one mechanical conveyor making it possible to shift the load in either direction and the presence of which is utilised to give the gondola a non-conventional shape which increases its capacity.

The chassis carrying the gondola is articulated relatively to the chassis of the driving and steering unit so as to be able to swing transversely about the longitudinal axis of the vehicle.

The electrically-driven vehicle may comprise batteries which make independent movement possible to it beyond the end of overhead trolley line, for example for approaching a working face of coal in a mine where permanent electric trolleys have not as yet been installed, and allow the independent supplying of current to the motor of the conveyor.

Unloading is effected at the rear and for this purpose the rear door of the gondola is in the form of a spout, preferably operated by a jack. Alternatively, the unloading may take place either laterally near the front of the gondola proper, i.e. immediately at the rear of the driver's cab, or vertically in the central part of the vehicle. The new vehicle thus combines the advantages of the vehicles known at shuttle-cars, which are adapted to shuttle backwards and forwards over short distances and at reduced speeds with the advantages of the lorry which carries large loads over long distances.

Other features of the invention will become apparent from the following description of one embodiment, it being understood that the generic scope of the invention is not limited to the specific features described therein.

Figure 1B:
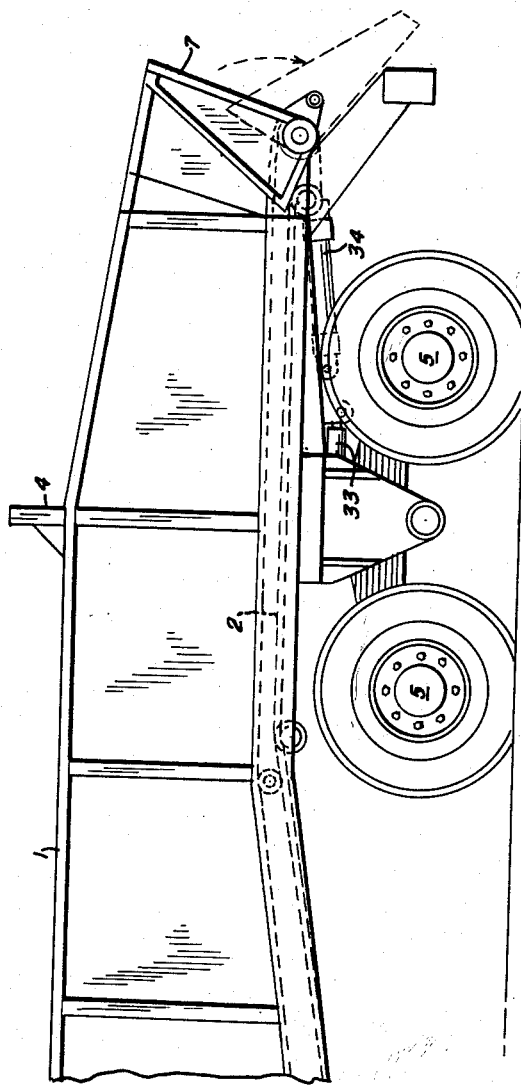
Figure 2:
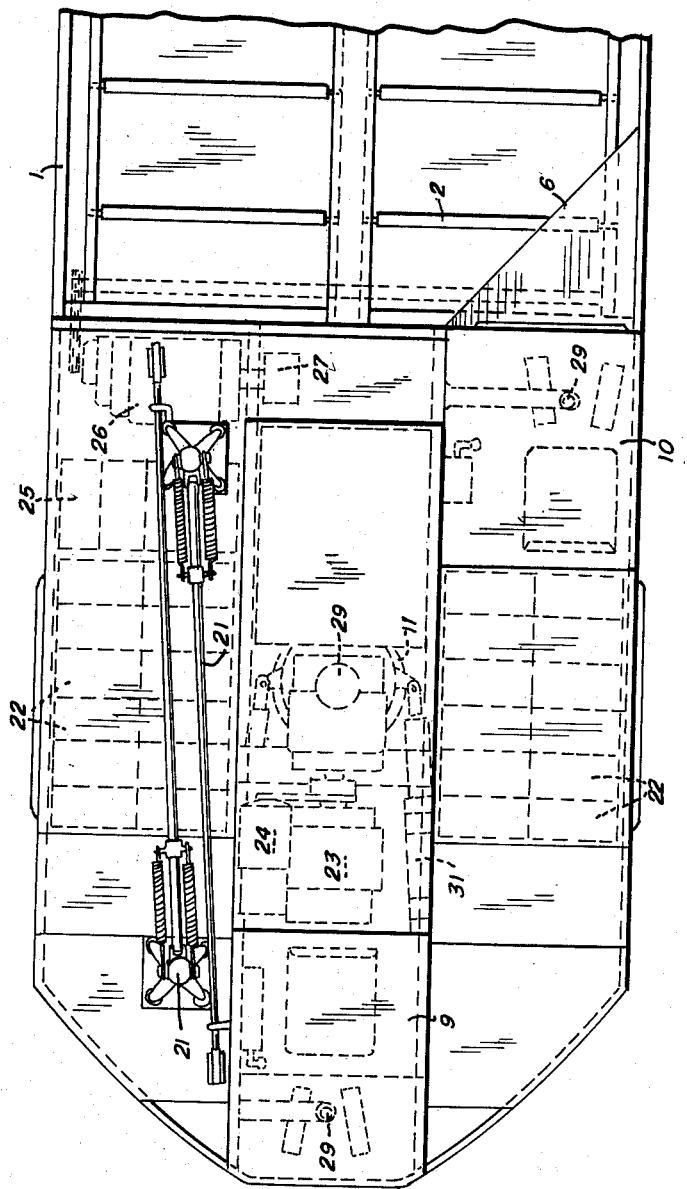
Figure 3:
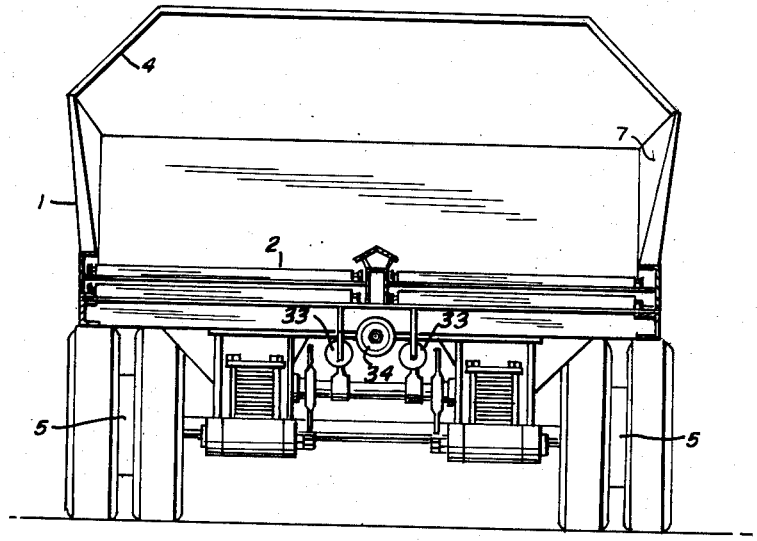
Figure 4:
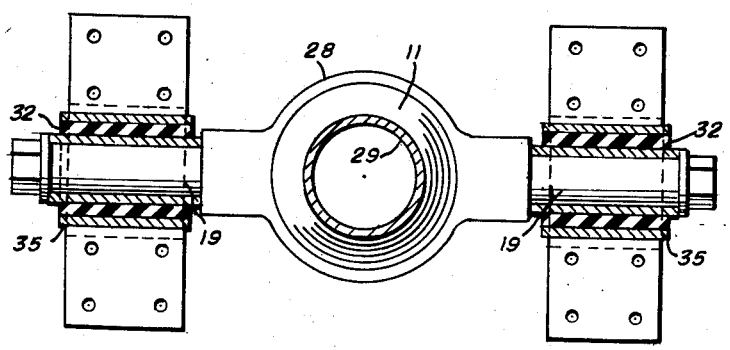
Figure 5:
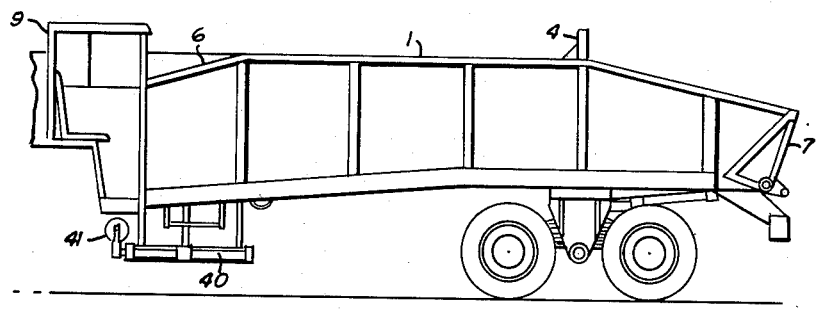
Figure 6:
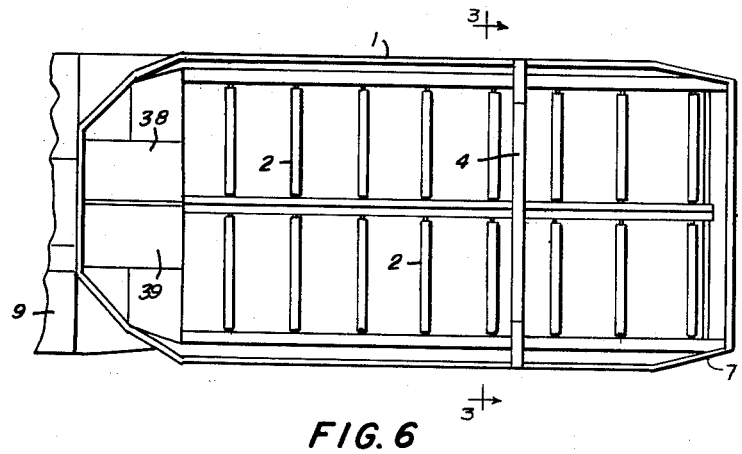
Figure 10:
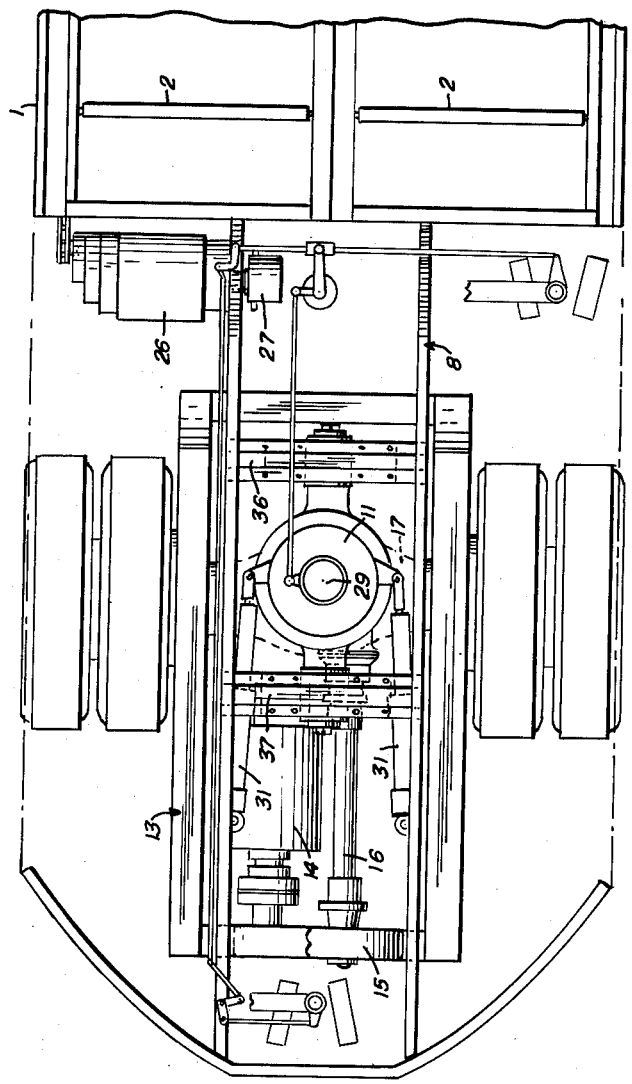

In the accompanying drawings:

FIGURES 1A and 1B are an elevation of a vehicle according to the present invention, FIGURE 2 is a partial plan view of the vehicle of FIGURE 1, FIGURE 3 is a section taken at 3—3 in FIGURE 6, FIGURE 4 is a plan view, partly in section, of the connection between the vehicle power unit and the gooseneck seen generally in FIGURE 10, FIGURE 5 is an elevation of a front unloading gondola of a vehicle of the present invention, the vehicle cab being broken away, FIGURE 6 is a plan view of FIGURE 5, FIGURE 7, 8 and 9 show, respectively, the front single axle tractor (one wheel removed), the rear axle assembly, and the gondola and chassis structure of the vehicle. These three figures form an exploded view of the basic structure of the vehicle, and FIGURE 10 is a plan view similar to FIGURE 2 with the cab removed.

In the drawings, 1 is the cargo carrying body portion of the vehicle which for convenience and by analogy to bulk carrying railroad cars will be called the gondola, 8 is the chassis carrying the gondola composed of two goose-necked beams, and 13 the steering and driving chassis.

The gondola is provided with a double scraper conveyor 2, which is of the conventional type and therefore will not be described in detail.

This conveyor is controlled by the motor 26 which, at the same time drives the hydraulic pump 27 supplying the general pressure fluid circuit for operation of jacks as used in steering for instance.

The presence of the conveyor makes it possible to give the gondola a downwardly-inclined form towards the front, which is novel per se, the capacity being thereby considerably increased.

The rear of the gondola is constituted by a rear tippanel 3 provided with lateral side-pieces 7, so as to form an unloading spout. The gondola is preferably provided with a gauge bar 4 so that the height of loading permitted by the galleries in which the car has to circulate is not exceeded.

The unloading spout is operated by the jack 34; the cylinders of the rear brakes are designated 33.

The beam chassis or frame 8 of the gondola is supported at the rear by the twin bearing axles 5 while at the front this chassis rests on the chassis 13 of the driving unit on a vertical pivot 11 of the driving chassis 13. A suspension means indicated generally at 12, which is more specifically described below, permits rocking of the axle about a horizontal longitudinal axis to compensate for uneven ground surfaces.

Propulsion is effected by the driving and steering axle of the chassis 13, which is driven by the electric motor 14.

The motor drives, through an elastic coupling, a speed-reducing gear 15 (see FIGURE 10) having helical pinions, the secondary shaft of which drives, through a telescopic cardan transmission 16, differential double reduction axle 17, the thrust of which is transmitted to the chassis by push-rods 18.

The suspension is effected by semi-elliptic springs, as known in the art.

The complete mechanical unit (FIGURE 7) is carried by the short chassis 13 of welded sheet steel comprising a double-bearing hollow vertical pivot 11 having conical rollers, on which the chassis 8 bears through two longitudinal elastic links 12.

The equipment includes two pole current collectors or trolleys 21 for forward and backward travel; the battery 22 effects independent travel during which it supplies the motor 14 and motor 26.

The recharging of the battery is effected by a converter set 23 supplied during traction when either of the trolleys are in use.

In operation the car moves in a forward direction when it is loaded and backwards when it is empty. When loaded, it is driven from the cab 9 provided on front in the axis of the vehicle.

For driving it backwards when empty, the driver has a cab 10 disposed behind cab 9 so that he has a clear view in the direction of the axis of the vehicle through the rear opening in the gondola, the panel 3 of which may therefore be folded right back.

The cut of corners 6 provide a clear view to the sides.

The starting resistances are designated 20, the auxiliary generator 24 and the auxiliary recharging battery 25; this battery supplies the auxiliary circuits of the driving equipment which are thus completely independent.

31 are the steering jacks, which are provided on the chassis 8 and which control the steering unit by any suitable means.

As can be seen in FIGURE 4, the suspensions 12 comprise pins 19 which are integral with the fork 28 of a hollow vertical pivot 29. Each pin 19 is surrounded by a rubber sleeve 32 which gives pins 19 a certain freedom in relation to the steel sleeve 35 fixed to the transverse beams 36 and 37, which are carried by the goose-necked beams of the front chassis 8.

The loading of the vehicle will generally be effected through the rear of the gondola, which is made underslung for this purpose.

As the materials are deposited at the rear end, the driver operates the scraper conveyor 2 which moves the load right to the front end of the gondola.

Unloading is also effected through the rear, the load being moved towards the rear by the conveyor towards the unloading spout.

The alternative embodiment shown in FIGURES 5 and 6 provides the possibility of unloading at the front of the gondola through a trap in the central part.

In this case the front of the conveyor 2 ends at a certain distance from the rear wall of the cab 9, at the level of a discharging hopper. This hopper is constituted by sheets 38, 39 inclined towards the longitudinal axis of the gondola, and the closing of the bottom of the hopper is effected by panels 40 tilting about a horizontal axis, the movement thereof being controlled by a jack 51.

By way of modification, the car may be driven by a thermal motor coupled with a generator, for example an electric diesel group.

What I claim is:

1. In a power-driven burden vehicle adapted for operation in two opposite directions without turning around, such as a mine vehicle or the like, a main chassis including lengthwise beams supporting a gondola, a rear truck supporting the rear end of said chassis, a front driving and truck unit including a power-driven single front axle, a vertical-axis steering connection between said front unit and the forward end of said main chassis, power means for relatively rotating the parts of said steering connection to steer said vehicle, two separate control cabs carried by and disposed on said chassis one behind the other, the foremost cab being disposed forward relatively to said front axle, the rearmost cab being disposed backward relatively to said front axle and forward relatively to the forward end of the gondola, said lengthwise beams being formed as a gooseneck, the higher part of said beams extending above and sufficiently forward relatively to said front axle to sustain the foremost cab.

2. A vehicle in accordance with claim 1, in which the part of said beams supporting the gondola are downward and forwardly inclined towards said front axle, and in which a mechanical conveyor is provided along the floor of the gondola for moving the load lengthwise thereof.

3. A vehicle as claimed in claim 1, characterized by the feature that it comprises storage batteries capable of imparting independent movement to the vehicle beyond the line supplying the electric motor.

References Cited in the file of this patent

UNITED STATES PATENTS

| | | |
|---|---|---|
| 1,125,184 | Schleicher | Jan. 19, 1915 |
| 1,877,126 | Greer | Sept. 13, 1932 |
| 2,198,407 | De Brun | Apr. 23, 1940 |
| 2,219,533 | Ross | Oct. 29, 1940 |
| 2,274,313 | Whaley | Feb. 24, 1942 |
| 2,291,626 | Huber | Aug. 4, 1942 |
| 2,368,202 | Clark | Jan. 30, 1945 |
| 2,400,218 | Akers | May 14, 1946 |
| 2,457,569 | Lee | Dec. 28, 1948 |
| 2,543,519 | Baechli | Feb. 27, 1951 |
| 2,592,532 | Beck | Apr. 5, 1952 |
| 2,827,715 | Wagner | Mar. 25, 1958 |

FOREIGN PATENTS

| | | |
|---|---|---|
| 720,244 | Germany | Apr. 29, 1942 |
| 532,498 | Belgium | Oct. 30, 1954 |
| 1,019,852 | Germany | Nov. 21, 1957 |